(12) United States Patent
Rajahalme et al.

(10) Patent No.: US 7,647,374 B2
(45) Date of Patent: Jan. 12, 2010

(54) METHOD FOR MANAGING SESSIONS BETWEEN NETWORK PARTIES, METHODS, NETWORK ELEMENT AND TERMINAL FOR MANAGING CALLS

(75) Inventors: Jarno Rajahalme, Kirkkonummi (FR); Christophe Bouret, Helsinki (FI)

(73) Assignee: Nokia Corporation, Espoo (FI)

( * ) Notice: Subject to any disclaimer, the term of this patent is extended or adjusted under 35 U.S.C. 154(b) by 527 days.

(21) Appl. No.: 10/483,006

(22) PCT Filed: Jul. 3, 2001

(86) PCT No.: PCT/EP01/07601

§ 371 (c)(1),
(2), (4) Date: Jul. 19, 2004

(87) PCT Pub. No.: WO03/005668

PCT Pub. Date: Jan. 16, 2003

(65) Prior Publication Data

US 2005/0021616 A1    Jan. 27, 2005

(51) Int. Cl.
*G06F 15/16* (2006.01)
(52) U.S. Cl. .................. 709/204; 709/223; 709/227; 455/414.14; 455/416; 455/435.1; 455/460
(58) Field of Classification Search .................. 709/204
See application file for complete search history.

(56) References Cited

U.S. PATENT DOCUMENTS 5,943,334 A * 8/1999 Buskens et al. ............. 370/350

6,088,728 A    7/2000 Bellemore et al.

FOREIGN PATENT DOCUMENTS

WO    WO 01/47212 A1    6/2001

OTHER PUBLICATIONS

3GPP TSG SA#11, 3GPP TS 23.228 V5.0.0, Apr. 2001, 3GPP, subclause 4.6.3, 5.2.2.3, 5.4.5, 5.10.1, 5.10.3.2, 5.11.6.2.3, Figure 5.15.*

(Continued)

*Primary Examiner*—Yves Dalencourt
*Assistant Examiner*—Michael C Lai
(74) *Attorney, Agent, or Firm*—Banner & Witcoff Ltd

(57) ABSTRACT

The invention relates to a management of sessions between parties being connectable with a network. Thereby a first party registers to the network and invites a second party to a session. It is determined from a session information whether said session is to be retained by the network. The retaining comprises storing at least part of the session information for a subsequent re-establishment or release of the session by the network on behalf of said first party, releasing said retained session by the network towards the second party on behalf of the first party, when the first party deregisters from the network or loses connection to the network, re-establishing the retained session by the network towards the second party on behalf of the first party, when the first party repeatedly registers to said network or re-establishes connection with said network. Furthermore, the invention relates to methods and a network element for managing multiple simultaneous sessions between parties participating in one or a plurality of calls and to a corresponding terminal.

33 Claims, 5 Drawing Sheets

OTHER PUBLICATIONS

3GPP TSG SA#11, 3GPP TS 23.228 V5.0.0, Apr. 2004, 3GPP, 126 pages.*

Schulzrinne, et al., "The Session Initiation Protocol: Providing Advanced Telephony Services Across the Internet," Bell Labs Technical Journal, Bell Laboratories, US, vol. 3, No. 4, Oct. 1998, pp. 144-160.

Handley, et al., "SIP: Session Initiation Protocol," Internet Engineering Task Force, Jun. 5, 2000, pp. 1-129.

* cited by examiner

METHOD FOR MANAGING SESSIONS BETWEEN NETWORK PARTIES, METHODS, NETWORK ELEMENT AND TERMINAL FOR MANAGING CALLS

FIELD OF THE INVENTION

The present invention relates to a method for managing sessions between network parties, methods and a network element for managing multiple simultaneous sessions between parties participating in one or a plurality of calls or group calls and to a terminal for use in such methods.

BACKGROUND OF THE INVENTION

In 3GPP (3rd Generation Partnership Project) as UMTS (Universal Mobile Telecommunications Systems) SIP (Session Initiation Protocol) is used to establish multimedia sessions or calls e. g. VoIP (Voice over Internet Protocol) sessions.

SIP is generally described e.g. in "SIP: Session Initiation Protocol" by Handley/Schulzrinne/Schooler/Rosenberg; Internet Engineering Task Force SIP WG; internet-draft: ietf-sip-rfc2543bis-02 dated Nov. 24, 2000.

A multimedia session is defined as a set of a multimedia sender and a multimedia receiver whereby data streams flowing from the sender to the receiver. Multimedia sessions include internet multimedia conferences, internet telephone calls and multimedia distribution.

SIP is a request-response control (signalling) protocol for initiating, maintaining and terminating sessions between terminals. SIP is an application level protocol which is used in packet switched environments, e. g. GPRS (General packet radio service) systems, UMTS or packet cable (USA cable modem standard) systems. SIP can be used in any reliable or unreliable protocol including UDP (User Datagram Protocol), SCTP (Stream Control Transmission Protocol) and TCP (Transmission Control Protocol).

SIP uses SIP messages to negotiate between the participants of a SIP session, i.e. between parties or terminals.

SIP, however, is not only used for sessions between two parties but also for group calls, such as conference calls. In a group call all parties can in turn talk or send videos and listen to each other. A group call is used in various activities in which several users participate, e.g. when a whole group must continuously be aware of the progress of events.

Such group calls as well as automatic group call services can be implemented on top of SIP standards, such as the implementation of PMR (Private Mobile Radio) over SIP.

When a terminal registers to a network it is determined whether there are existing or remembered group calls for that party or terminal. If there are such remembered group calls SIP INIVITE messages are sent to the other participants of such a group call in order to set up SIP sessions with each of the other terminals.

However, SIP requires some amount of signalling for each SIP session set-up. For applications where the SIP user agent of a party or terminal is involved in many sessions and/or in many group calls that are typically long lasting, where the user terminal can be frequently powered on and off, and/or network capacity between the terminals' SIP user agents and the network is scarce or needs otherwise to be preserved, the amount of session related signalling as to the known SIP implementations may be too much.

SUMMARY OF THE INVENTION

It is therefore an object of the present invention to optimize signalling between a between parties connectable with a network.

This object is achieved by a method for managing sessions between parties being connectable to a network comprising the steps of:
  a first party registering to said network,
  said first party inviting a second party to a session,
  determining from a session information relating to said session whether said session is to be retained by the said network,
  said retaining comprising storing of at least part of said session information for a subsequent re-establishment or release of the said session by said network on behalf of said first party,
  releasing said retained session by said network towards said second party on behalf of said first party, when said first party deregisters from said network or loses connection with said network,
  re-establishing said retained session by said network towards said second party on behalf of said first party, when said first party repeatedly registers to said network or re-establishes connection with said network.

This object is further achieved by a method for managing multiple simultaneous sessions between parties participating in one or a plurality of calls, in particular by using a method according to any one of the preceding claims, wherein each of said parties are destined for being in respective sessions with all of the other parties or at least one of the other parties, at least the sessions between a first party and further parties being respectively divided in
  a first subsession between said first party and a network element, and
  a second subsession between said network element and a call-signalling entity serving a call with at least one of said further parties, thereby combining first subsessions between said first party and said network element in a combined session and/or second subsessions between said network element and said call-signalling entity in a combined session.

This object is further achieved by a method for managing multiple simultaneous sessions between parties participating in one or a plurality of group calls, wherein each of said parties are destined for being in respective sessions with all of the other parties or at least some of the other parties, at least the sessions between a first party and further parties being respectively divided in
  a first subsession between said first party and a network element, and
  a second subsession between said network element and a group call server serving a group call with at least one of said further parties, thereby combining first subsessions in a combined session between said first party and said network element.

Furthermore, the above object is achieved by a network element for managing multiple simultaneous sessions between parties participating in one or a plurality of calls or group calls, wherein each of said parties are destined for being in respective sessions with all of the other parties or at least one or some of the other parties, said network element comprising separating means for separating respectively at least the sessions between a first party and further parties in
- a first subsession between said first party and said network element, and
- a second subsession between said network element and a call-signalling entity or group call server serving a call or group call with at least one of said further parties, wherein first subsessions between said first party and said network element are combined in a combined session and/or second subsessions between said network element and a call-signalling entity or group call server are combined in a combined session.

Furthermore the above object is achieved by a party for use in such a method comprising:
- combining means for combining messages to be sent from said first party via a network element and one or more call-signalling entities or group call servers to further parties in a combined message for use in a combined session, and
- splitting means for splitting combined messages to be received from a network element being transmitted from one or more call-signalling entities or group call servers into a number of messages.

The invention optimizes the signalling, in particular SIP signalling between a party or terminal participating or entering one or a plurality of group calls and a network. Furthermore, the invention enables to expedite call set-up procedures for parties or terminals, in particular mobile stations. The invention is particularly advantageous when there are multiple groups and only a narrow-band transmission resource is available for signalling such as in mobile networks, in particular in packet switched networks such as UMTS or GPRS (General Packet Radio Service) networks.

Furthermore, User Agent set-up delay can be minimized, so that a party or terminal may start using sessions much faster compared to prior art solutions.

Preferably, the above mentioned combining step of combining second subsessions involves combining of media streams from second subsessions between said network element and at least one of said further parties into a single media stream relating to the first subsession between said first party and said network element. In particular the media stream combining is performed by a media proxy in association with said network element. Preferably, the call signalling entity is a group call server and the call signalling entity is a session initiation protocol (SIP) proxy associated with one of the parties.

The media proxy terminates from one end the media streams related to the second subsessions and the media stream related to the first subsession.

Preferably, a media proxy moves packets between the media streams related to the second subsessions and media stream associated with the first subsession.

Preferably, multiple sessions are initiated by the above mentioned first party with a single combined message that is transmitted from the first party to the network element, whereby that combined message combines message content for the group call server, thereby transmitting shared content in said combined SIP message just once. Thus signalling and session set-up time as well as network capacity and bandwidth in uplink is saved.

Preferably, the network element is collecting response messages sent from other group call servers in response to a request message from the first registering party, thereby combining content of the response messages and eliminating repeated content and generating a further combined message that is transmitted from the network element to the registering party.

Thus, this party sees only a single session towards the network element. When the set-up has been performed, the party is notified of the establishment of all the sessions with the other parties/participants via the network element. The call completion success of all calls is then reported to the registering party using a single message. A benefit thereof is that the network element can send a unified response message to the registering party indicating (re-)establishment of remembered sessions, thereby saving signalling and session set-up time as well as network capacity and bandwidth in downlink.

Preferably, the network element comprises a register for storing information indicating remembered sessions for parties. Thus, information about existing group calls to which parties have joined is available from the network element for the parties. The register is meaningful and possible due to the home network control paradigm of 3GPP. The register assists the network element in remembering session set-up parameters for the sessions and thus the network element can act as a proxy for the parties.

Furthermore, it is preferred that the network element determines in response to a message of a registering party whether there are remembered sessions for that party and if there are remembered sessions, sending messages to each group call server of the parties of said remembered sessions.

Thus, the register effects registration and call set-up in the way that when a subscriber terminal registers to the network, it is automatically (re-)connected to the group calls it belongs to. This means that when e.g. a SIP REGISTER message is received from the network element, the network element starts immediately the set-up of a group call or group calls to the appropriate group call server(s) by sending multiple SIP INVITE messages.

Further advantageous developments are defined in the dependent claims.

BRIEF DESCRIPTION OF THE DRAWINGS

In the following, the present invention will be described in greater detail based on preferred embodiments with reference to the accompanying drawings, in which.

DESCRIPTION OF THE PREFERRED EMBODIMENTS

Figure 1:
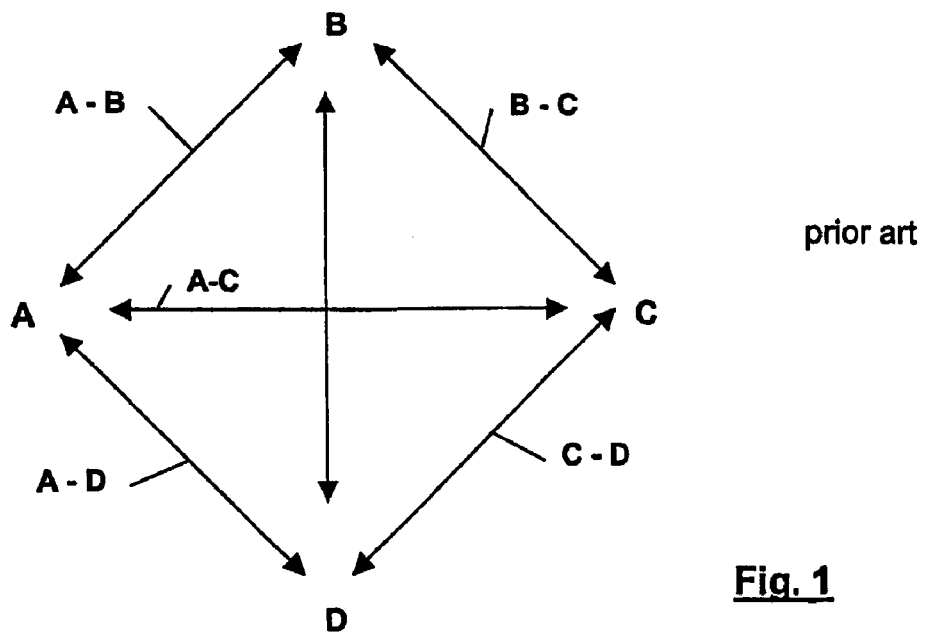
FIG. 1 shows a schematic diagram of SIP session relations between terminals of a group call according the prior art.

FIG. 1 shows four terminals A, B, C, D that are participating in a group call. Thereby, terminal A is in a SIP session with terminal B, C and D, respectively. Terminal B is in a SIP session with terminal A, C and D, respectively. Terminal C is in a SIP session with terminal A, B and D, respectively. Correspondingly, terminal D is in a SIP session with terminal A, B and C, respectively.

The respective session relations are indicated in FIG. 1 by double arrows. Double arrow A-B indicates the session between terminals A and B. Double arrow B-C indicates the session between terminals B and C. Double arrow C-D indicates the session between terminals C and D. Double arrow A-D indicates the session between terminals A and D. Double arrow A-C indicates the session between A and C and double arrow B-D indicates the session between terminals B and D.

Thus, each terminal A, B, C, D exchanges SIP messages with each of the other terminals for initiating, maintaining and terminating SIP sessions. As a result, in particular in case of a large number of participants in a group call, the amount of SIP messages increases considerably. This is disadvantageous particularly in mobile networks due to the limited bandwidth of the air interfaces between the network and mobile terminals.

Figure 2:
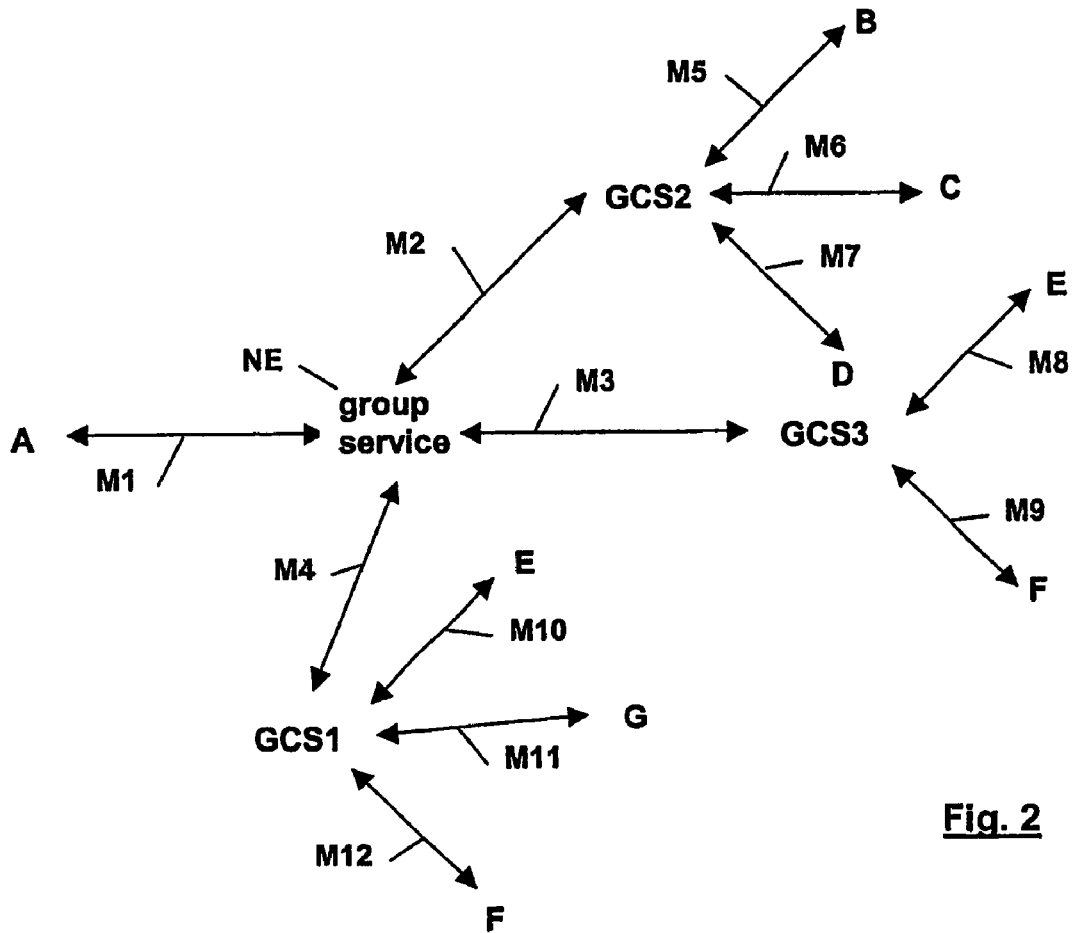
FIG. 2 shows SIP session relations between terminals of group calls and a network element according to a preferred embodiment of the present invention.

In FIG. 2 SIP session relations between terminal A on the one hand and terminals B to G on the other hand are formed by a combined SIP subsession between terminal A and network element NE comprising a group service GCS1, such as a proxy, a CPS (Call Processing Server) or a CSCF (Call State Control Function), in particular a serving CSCF.

The CSCF is preferably comprised in a server separate from an access subsystem, in particular anywhere in the internet. Thus, the CSCF is not regionally bound. Depending on the scale of the system and the particular embodiment, the access subsystem may comprise different numbers of base stations per CSCF. The access subsystem may also comprise other network elements such as radio network controllers or base station controllers via which the CSCF communicates with the terminals, i.e. subscriber entities.

In the context of UMTS networks—in accordance with IP mobility subsystem specifications of 3GPP—the CSCF belongs to the core network and to the home network. The terminal communicates with the home network located CSCF via a tunnel from the visited network.

In another fixed network embodiment of the invention, the CSCF could, for instance, control a set of terminals belonging to a given network domain.

SIP messages content intended to be sent from terminal A to some of or all of the terminals B to G, respectively is sent as a combined SIP message M1 on an air interface between terminal A and the group service. This combined SIP message M1 comprises the information that would have been sent in individual SIP messages from terminal A to some of or all of the terminals B to G, namely the terminals of an actual group call. However, in the combined SIP message shared information or shared SIP message content is transmitted just once. As a result SIP signalling between terminal A and the network can be saved. Hence, network capacity and bandwidth can be saved as well.

Group service separates the SIP session relations between terminal A and group call servers GCS1, GCS2, GCS3, each of them serving existing or scheduled group calls with some of or all of the terminals B to G. Group call server GCS2 serves a group call with terminals B, C and D as well as with terminal A after (re-)insertion of terminal A in this group call. Group call server GCS3 serves a further group call with terminals E and F as well as with terminal A after (re-)insertion of terminal A in this further group call. Group call server GCS1 serves a still further group call with terminals E, F and G as well as with terminal A after (re-)insertion of terminal A in this still further group call. Thus, some of the terminals, namely E and F, are part of several group calls.

In particular group call server GCS1 splits a combined SIP message received from terminal A into a number of SIP messages for the group call servers GCS1, GCS2 and/or GCS3. A SIP message M2 is then sent from group service of network element NE to group call server GCS2 as a further combined SIP message. Alternatively a number (e.g. three) of individual SIP messages is sent from the group service to group call server GCS2, each of them being destined for one of the terminals B, C, D that are associated with group call server GCS2.

A further SIP message M3 is sent from the group service to group call server GCS3 as a further combined SIP message. Alternatively a number (e.g. two) of individual SIP messages is sent from the group service to group call server GCS3, each of them being destined for one of the terminals E, F that are associated with group call server GCS3.

A further SIP message M4 is sent from the group service to group call server GCS1 to terminal G as a further combined SIP message. Alternatively a number (e.g. three) of individual SIP messages is sent from the group service to group call server GCS1, each of them being destined for one of the terminals E, F, G that are associated with group call server GCS1.

Group call server GCS2 splits a received combined SIP message M2 into a number (e.g. three) of individual SIP messages M5, M6, M7 that are subsequently sent to terminals B, C, D, respectively.

Accordingly, group call server GCS3 splits a received combined SIP message M3 into a number (e.g. two) of individual SIP messages M8, M9 that are subsequently sent to terminals E, F, respectively.

Furthermore, group call server GCS1 splits a received combined SIP message M4 into a number (e.g. three) of individual SIP messages M10, M11, M12 that are subsequently sent to terminals E, F and G, respectively.

If group call server GCS1, GCS2 or GCS3 already receives individual SIP messages being respectively destined for terminals E, F, G or B, C, D or E, F, then these individual SIP messages are just forwarded to the respective terminals without changing message content.

In the opposite direction, namely when the group service receives SIP messages, in particular SIP response messages from further group call servers GCS1, GCS2, GCS3 the group service collects these received individual and/or combined SIP (response) messages. The group service analyzes these individual and/or combined SIP messages, eliminates repeated SIP content and generates a combined SIP message that is transmitted to terminal A as a single combined SIP message M1.

Again the amount of session related signalling between the network element NE comprising the group service and terminal A as well as the bandwidth of the air interface between the network element NE and terminal A can be saved since the size of the combined SIP message M1 is considerably smaller than the size of the sum of individual SIP messages sent from terminals B to G to the group service, respectively.

It is noted that the terminals E and F shown in FIG. 2 belong to two group calls whereas terminals B, C, D and G belong to just one group call, respectively. Terminal A, however belongs to three group calls. Accordingly each of group call servers GCS1, GCS2, GCS3 serve one group call.

Furthermore, it is noted that the group call servers GCS1, GCS2, GCS3 are located in different network elements.

Figure 3:
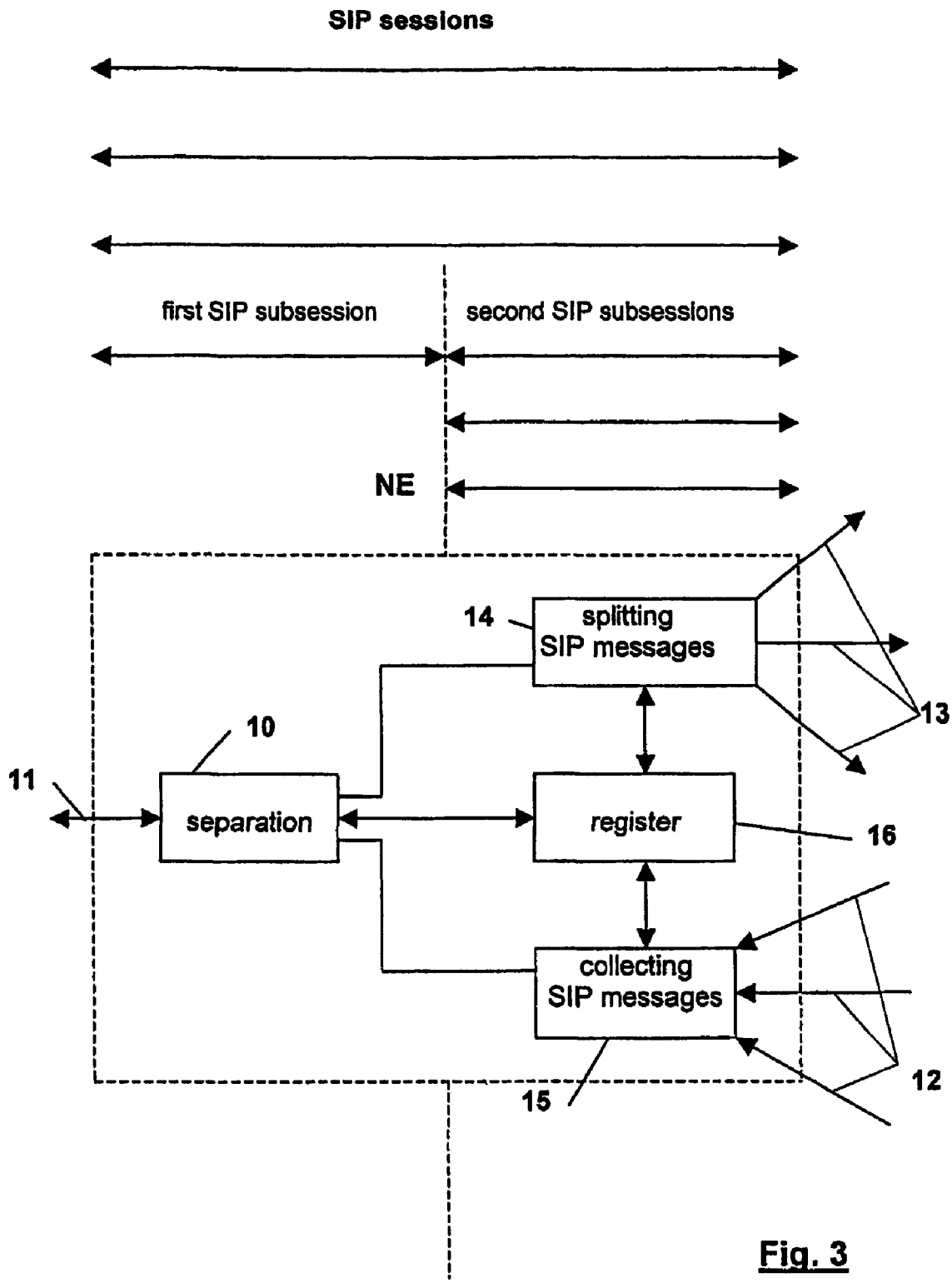
FIG. 3 shows a schematic block diagram of a network element according to a preferred embodiment of the present invention.

FIG. 3 shows a group serving network element NE in a simplified schematic block diagram. It is noted that a network element can comprise further features and functions. The features of the network element described hereinafter a preferably formed by software that is preferably implemented by means of hardware, in particular by a microprocessor/-controller, a random access memory RAM, a read-only memory ROM, etc.

Network element NE comprises a separation unit 10 for separating the SIP sessions between a first terminal (not shown in FIG. 3) communicating with the network element via an input/output interface 11 of the network element NE and group call servers, particularly via input interface 12 and output interface 13. Input/output interfaces 11, 12, 13 are preferably connected to one or more transceivers for exchanging (transmitting and receiving) data with mobile terminals, group call servers and a network.

Separation unit 10 separates a SIP session between a first terminal and a group call server into a first SIP subsession between the first terminal and the network element NE, e.g. a subsession via input/output 11; and a second SIP subsession between network element NE and a group call server, e.g. handled via input/output interfaces 12, 13.

Separation unit 10 is connected with a splitting unit 14 for splitting a combined SIP message received from a terminal via input/output interface 11 into a plurality of individual SIP messages being sent via output interface 13 to the group call servers.

A collecting unit 15 is connected to the separation unit 10. The collecting unit 15 receives multiple SIP messages via the inputs 12 from the group call servers, collects these SIP messages that are further combined to a combined SIP message that is sent via input/output interface 11 to the first terminal, in particular to a registering terminal (a terminal being in the progress of registering to a group call).

A register 16 is connected with the separation unit 10, the splitting unit 14 and the collecting unit 15 and provides these units with information regarding existing group calls to which terminals have joined. Furthermore, the register 16 receives information from the separation unit 10, the splitting unit 14, and/or the collecting unit 15 regarding group calls to which terminals have registered or unregistered.

Figure 4:
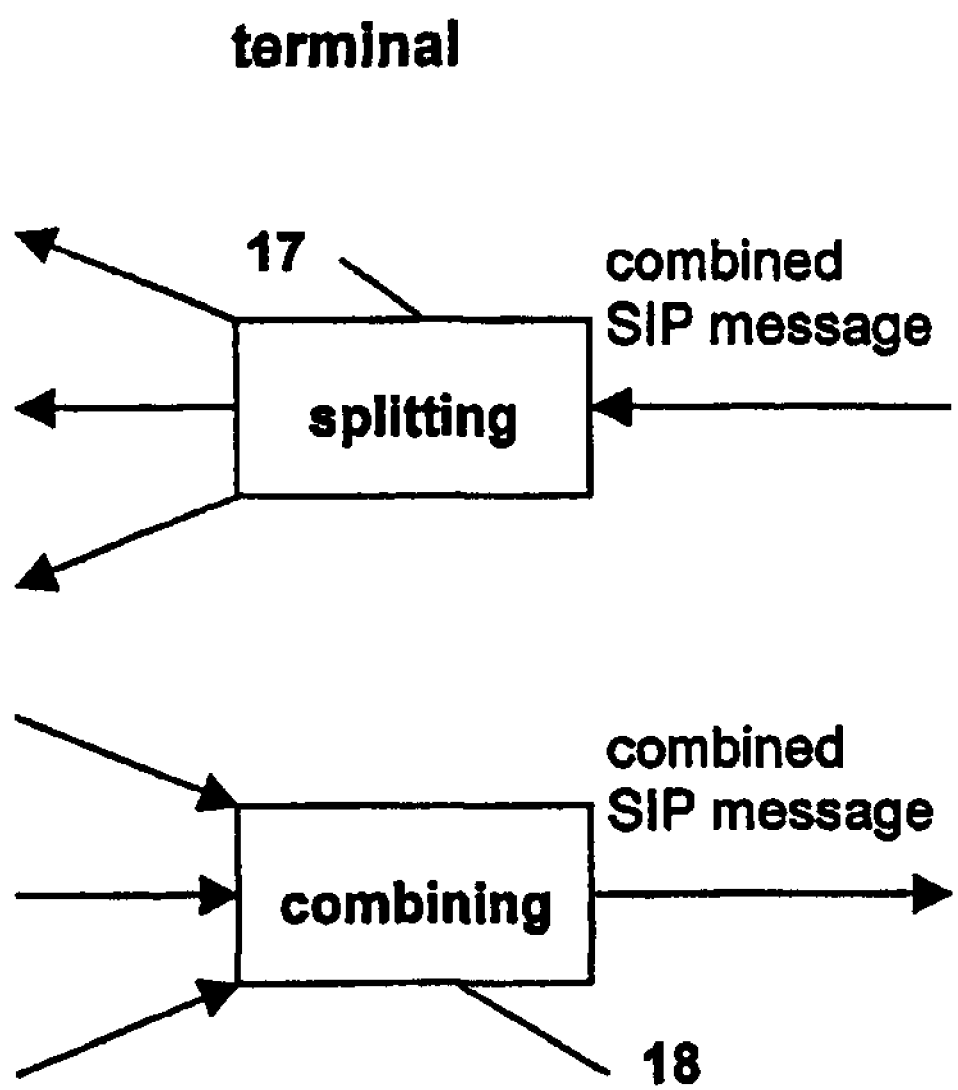
FIG. 4 shows a schematic block diagram of a terminal according to a preferred embodiment of the present invention.

It is noted that separation unit 10, splitting unit 14 and collecting unit 15 can be formed as individual units, as being indicated in FIG. 4, or can be formed as a single unit combining the functions of said units.

As a result, network element NE separates SIP sessions between one terminal and the group call servers serving group call with further terminals into the first SIP subsession and second SIP subsessions.

FIG. 4 shows a simplified block diagram of a terminal comprising a splitting unit 17 and a combining unit 18. Splitting unit 17 receives combined SIP messages in downlink from a network element, such as illustrated in FIG. 3. The content of such a combined SIP message is evaluated in the splitting unit 17 and converted into a number of individual SIP messages, each of said individual SIP messages being such as if they would have been transmitted individually from each of the other terminals of a group call.

In the other direction, namely in uplink, individually generated SIP messages are combined by the combining unit 18 and transmitted as a combined SIP message towards the network element or group service.

Figure 5:
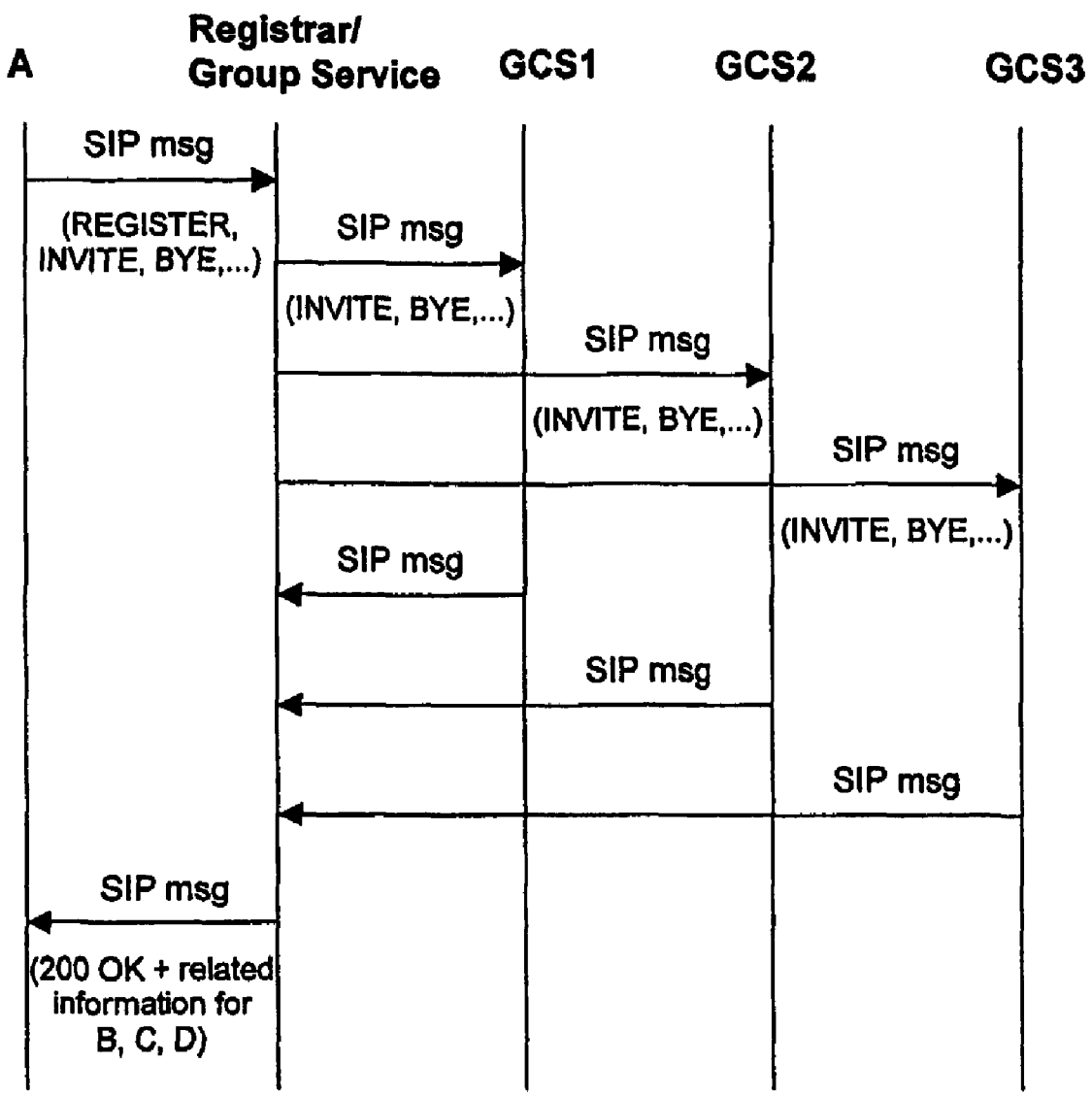
FIG. 5 shows a SIP message signalling diagram when a terminal is joining group calls according to the preferred embodiment shown in FIG. 2.

FIG. 5 shows the SIP message signalling diagram for mobile terminal A (re-)registering to existing group calls served by group call servers GCS1, GCS2 and GCS3 under control of SIP registrar/the group service as described above.

A SIP registrar is a server that accepts REGISTER requests. A registrar is typically co-located with a proxy or redirect server and may make its information available through a location server. A location server is used by a SIP redirect or proxy server to obtain information about a callee's possible location(s). Examples of sources of location information include SIP registrars, databases or mobility registration protocols. Location services are offered by location servers. Location servers may be part of a SIP server. The SIP server requests location services in a predetermined manner. Particularly, the SIP registrar maintains information on the subscribers current contact address, which can be a URL (Universal Resource Locator, which addresses an object, e.g. a computer, program, server, files, data bases, etc., instead of an absolute address of the object), a network address, etc. The contact address is such that by using it a terminating SIP session can be routed to the subscriber. The contact address may be modified in several turns, but essential is that by means of it the session can be routed to the subscriber.

Terminal A (re-)registers to the group call servers GCS1, GCS2, GCS3 by sending a SIP INVITE message to registrar/group service. In response thereto registrar/group service sends SIP INVITE messages to group call servers GCS1, GCS2, GCS3, respectively.

Group call servers GCS1, GCS2, GCS3 respond by sending SIP response messages to the SIP INVITE messages. Registrar/group service collects the SIP messages and sends a combined SIP response message to terminal A, e. g. a 200 OK SIP message including related information for group call servers GCS1, GCS2, GCS3 and/or the terminals participating in the respective group calls.

The same procedure applies when terminal A registers to a cell of a mobile network. Then, registrar/group service determines whether there are existing group calls for that terminal A. If there are such existing group calls, registrar/group service sends SIP INVITE messages to group call servers GCS1, GCS2, GCS3. Again group call servers GCS1, GCS2, GCS3 respond by sending SIP response messages to that SIP INVITE messages. Registrar/group service collects that response messages and sends a corresponding SIP message to terminal A. Thus, terminal A is registered to the group calls served by group call servers GCS1, GCS2, GCS3.

The same procedure applies when terminal A unregisters from existing group calls, e.g. by sending a SIP BYE message to registrar/group service which in turn sends corresponding SIP BYE messages to group call servers GCS1, GCS2, GCS3.

Figure 6:
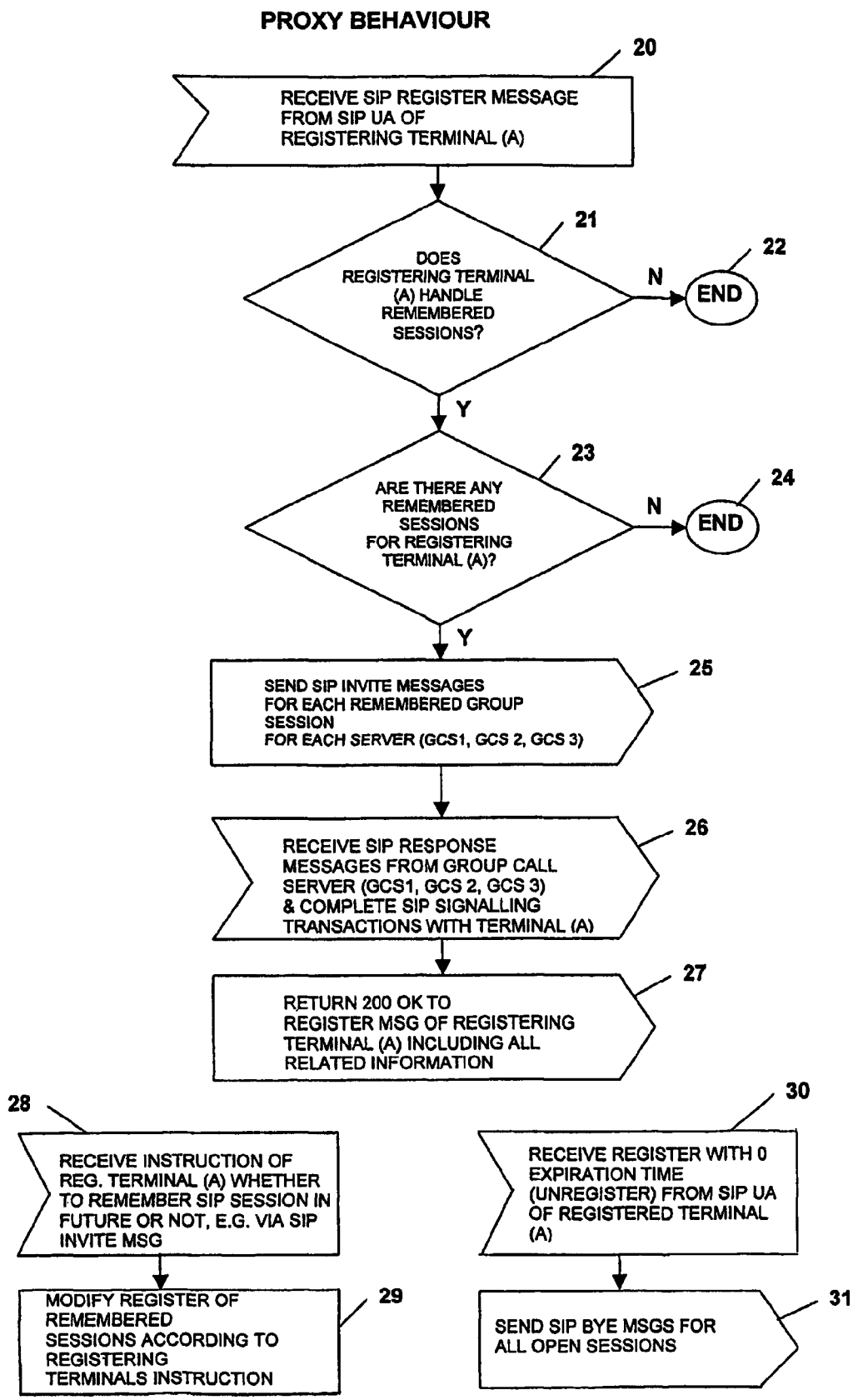
FIG. 6 shows a flow diagram depicting the operation of a network element according a preferred embodiment of the invention when a terminal registers or unregisters a group call session.

FIG. 6 shows a flow diagram depicting operation of a network element/group service/proxy when a terminal REGISTERs or unregisters to group call sessions.

When a SIP user agent of a mobile terminal REGISTERs to a network element, e.g. a proxy, the network element receives 20 a SIP REGISTER message from the SIP user agent of the registering terminal.

The network element determines 21 next whether the registering terminal is able to or intends to handle remember sessions. If the network element determines that the terminal does not handle remembered sessions, the procedure is ended 22 and the network element does not take any further steps at that stage with regard to group calls.

However, if it is determined that the registering terminal is able to or intends to handle remembered sessions, the network element determines 23 whether there are any remembered sessions for that terminal. If there are no remembered sessions for that terminal the procedure is ended 24 and the network element does not take any further steps at that stage with regard to group calls.

However, if a network element determines that there are remembered sessions, the network element sends 25 SIP INVITE messages to each of the group call servers GCS1, GCS2, GCS3 of the remembered sessions, thereby utilizing information send by the registering terminal in the above SIP REGISTER message. Such a REGISTER message is a kind of INVITE template, containing information that the network element cannot assume to remain the same between client registrations, e.g. Session Description Protocol related information such as RTP (Real-Time-Transport Protocol) IP (Internet Protocol) address(es) and port number(s) etc.

Then the network element receives 26 SIP response messages from the group call servers GCS1, GCS2, GCS3 and completes 26 SIP signalling transactions with the registering terminal.

Thereafter, the network element returns 27 a SIP 200 OK message to the initiating SIP REGISTER message including all related information. Thus, the SIP user agent of the registering terminal is able to set up its internal state to manage each SIP session.

The network element may receive 28 any time during such a procedure instructions from a terminal, in particular from the above mentioned registering terminal, whether to remember a SIP session in the future or not, e. g. via SIP INVITE message. In response to such a SIP message the network element modifies 29 its corresponding register of remembered sessions according to the terminals instructions.

If the network element receives 30 a SIP REGISTER message with 0 expiration time from the SIP user agent of a registered terminal in order to indicate unregistration, the network element sends 31 SIP BYE messages for all sessions the terminal had opened. Thus, the registered terminal does not need to tear down each session individually.

When the group service tries to contact the group call servers to insert the terminal to these group calls, two reactions to failure of one of the re-registration to a group call server are possible:

According to a first reaction, if one group call server contact is failing than all the operation is considered as failure. In that case terminal A has to re-register manually to all group call servers.

According to a second reaction, if one group call server contact is successful than the operation is considered as successful and other failures are ignored. In that case terminal A is notified of the failure cases and may register manually to the failed cases only.

The above described behaviour may thus manage sessions between parties that are either connected or in the progress of getting connected to a network. Thereby a mobile (terminal) registers to the network. This mobile may invite a second party to a session. The network determines from the session information relating to that session whether the session must be retained by the network or not. This retaining step comprises the storing of at least part of the session information for a subsequent re-establishment or release of the session by the network on behalf of the mobile.

When the mobile deregisters from the network or loses connection with the network, the said retained session is released by the network towards the second party on behalf of the mobile. When the mobile repeatedly registers to the network or re-establishes connection with the network, the retained session is re-established by the network towards the second party on behalf of the mobile. The registering step triggers the re-establishment of all the retained sessions on behalf of the mobile. Responses related to the re-establishment of all the retained sessions are collected by the network into a single response to the mobile.

The determination from the session information that the session must be retained is based on an indicator carried in a response message to the invitation message and/or on an analysis of session information such as the identity of the said second party.

The session information is preferably deleted when a mobile leaves the session.

The said second party is preferably a SIP signalling entity which in turn can be a group call server or a SIP terminal.

According to preferred embodiments of the present invention in particular the three following procedures can be carried out.

According to a first procedure a SIP user terminal forms only a single session with a network element, e. g. a network resident proxy managing the user's membership in various parallel SIP sessions. The proxy will then manage media from the various parallel sessions to be sent or to be redirected to the SIP user terminal. Using this procedure, the SIP User Agent in the terminal only manages one SIP session with the proxy, and the signalling between the SIP user terminal and the network is thus minimized—reduced back to the case of only one SIP session.

Alternatively, some proprietary signalling could be used between the user terminal and the proxy, thus possibly optimizing the signalling event further. Then, the SIP user terminal will not be aware of the various parallel SIP sessions—at least not at SIP protocol level.

The second procedure initiates signalling for multiple SIP sessions with one SIP message only. Thereby, the fact is utilized that most of the content of SIP INVITE messages for all of the simultaneous SIP sessions is in fact the same for all the sessions, and can therefore be represented in much more compact format by combining the signalling message into one message, where shared information is not unnecessarily repeated. A network resident SIP proxy can then split the message into multiple SIP messages, should the recipients of the signalling messages be different for some or all SIP sessions.

The network resident proxy can also collect SIP response messages for multiple sources and redirect them back to the SIP user terminal in a compact, combined format, thus reducing the number of bytes that need to be transmitted over the network.

This second procedure can be applied to all SIP transactions and not just INVITE messages, where multiple similar signalling messages would otherwise be sent.

The third procedure is for a network resident proxy for remembering which sessions the SIP user terminal has initiated and/or has been invited to. Then later, when the SIP user terminal communicates with the proxy, e. g. via a SIP REGISTER message or some other method, the proxy could return information, e. g. via a SIP 200 OK message to the SIP REGISTER message, about the remembered sessions to the user terminal. Thereby, a corresponding information for each session is returned, for the SIP user terminal to be able to form session state equivalent of the case where the terminal was itself involved in the session set-up without the proxy. Alternatively, only session contact information is returned and the SIP terminal itself needs to set-up the actual SIP sessions.

Additionally, an information can be added to a SIP INVITE message header to let the proxy know if a particular session being setup should be remembered or not. This could be either through a new SIP message header, or through an optional parameter to some existing SIP message header. Alternatively, the proxy could get its information from somewhere else, e. g. from other SIP signalling during the SIP transactions, from an external server, from configuration information, etc. In this case the proxy remembers only a subset of the sessions the SIP user terminal is/was involved.

Finally, a signalling procedure is used for tearing down the session state from the proxy, so that the session in question is no longer remembered. The regular SIP BYE method can be used for this purpose.

The above described third procedure, namely when the proxy manages the SIP sessions, can be taken as a special form of the above described first procedure, where the individual SIP session state is managed—at least partially—by the SIP user terminal via SIP signalling through the proxy. The third procedure can also be combined with the second procedure, so that the returned SIP session (of multiple SIP sessions being remembered) related information can be returned from the proxy to the SIP user terminal in one single signalling message, utilizing the repeated information in each set of session information.

In an easier form the third procedure only provides the terminal with a list of remembered sessions and the terminal would then manage session set-up via individual SIP INVITE messages or utilize the second procedure to combine the multiple SIP messages into one.

Additionally, the capability to utilize the above described procedures or subsets thereof can be negotiated between the SIP user terminals and the network resident proxy.

Utilization of these procedures can be arranged so that at some level in the SIP user terminal software, the sessions utilizing any of these methods can be made indistinguishable from the sessions set up without these procedures. Hence transparency is enabled. On the network side, the proxy can play the SIP messaging so that no other SIP entities in the network need to be capable of using any of the above described procedures. Hence interoperability is enabled.

It is noted that the present invention is not restricted to the preferred embodiments described above, but can be implemented in SIP as well as in other signalling protocol or systems for initiating, maintaining and/or terminating sessions.

Furthermore, the other parties in the sessions to be recalled are group call servers and preferably not point-to-point terminals. Then, the group call servers implement a bridge functionality for the group call. Therefore, they control which of the users is at a moment the one heard by others, if exclusive access to the broadcast is required. Otherwise they just do the conference bridge functionality of combining the speech signals. For each of the group call servers there is a list of subscribers attaching to their group call i.e. B, C, D for GCS2 and E, F for GCS3 etc. Thus, preferably the invention is about restoring connections to group call servers.

Furthermore, the invention can be implemented in any fixed or wireless network, in particular in a packet switched mobile network environment particularly with any number of participants in a group call. The terminals may either be static or mobile terminals such as mobile phones. Furthermore, a specific terminal may participate in more than one group call at a time. Thus, the preferred embodiments may vary within the scope of the attached claims.

The invention claimed is:

1. A method comprising:
registering a first party to a network,
receiving an invitation message from said first party inviting a second party to a session,
determining from a session information relating to said session whether said session is to be retained by said network,
retaining the session by the network in response to the determining,
said retaining comprising storing of at least part of said session information for a subsequent re-establishment or release of said session by said network on behalf of said first party,
releasing said retained session by said network towards said second party on behalf of said first party, when said first party deregisters from said network or loses connection with said network,
re-establishing said retained session by said network towards said second party on behalf of said first party, when said first party repeatedly registers to said network or re-establishes connection with said network,
wherein said method is used for managing multiple simultaneous sessions between parties participating in one or a plurality of group calls, and wherein each of said parties is destined for being in respective sessions with all of the other parties or at least some of the other parties, at least the sessions between said first party and further parties being respectively divided in
a first subsession between said first party and a network element, and
a second subsession between said network element and a call-signaling entity serving a group call with at least one of said further parties,
thereby combining first subsessions in a combined session between said first party and said network element,
wherein said network element stores information in a register, said information indicating remembered sessions for parties.

2. A method according to claim 1, wherein said registering triggers said re-establishing of all retained sessions on behalf of said first party by said network.

3. A method according to claim 1, wherein responses relating to said re-establishing of all retained sessions are collected by said network into a single response to said first party.

4. A method according to claim 1, wherein at least said first party is a mobile terminal.

5. A method according to claim 1, wherein at least said second party comprises a session initiation protocol (SIP) signaling entity.

6. A method according to claim 5, wherein said session initiation protocol (SIP) signaling entity comprises a group call server or a session initiation protocol (SIP) terminal.

7. A method according to claim 1, wherein said determining from said session information relating to said session whether said session is to be retained is based on an indicator carried in a response message to an invitation message for inviting a party to a session.

8. A method according to claim 1, wherein said determining from said session information relating to said session whether said session is to be retained is based on an analysis of said session information that comprises an identity of said second party.

9. A method according to claim 1, wherein said stored at least part of said session information is deleted when said first party leaves said session.

10. A method according to claim 1, further comprising combining said second subsessions between said network element and said call-signaling entity in a second combined session.

11. A method according to claim 10, wherein said combining of said second subsessions involves combining of media streams from second subsessions between said network element and at least one of said further parties into a single media stream relating to the first subsession between said first party and said network element.

12. A method according to claim 11, wherein said media stream combining is performed by a media proxy in association with said network element.

13. A method according to claim 10, wherein said call-signaling entity comprises a group call server.

14. A method according to claim 10, wherein said call-signaling entity comprises a session initiation protocol (SIP) proxy associated with one of said parties.

15. A method according to claim 1, wherein multiple sessions are initiated by said first party with a single combined message transmitted from said first party to said network element, said combined message combining message content for said call-signaling entity, thereby transmitting shared content in said combined message just once.

16. A method according to claim 15, wherein said network element splits said combined message into multiple messages, whereby each of said multiple messages being respectively sent from said network element to one of a plurality of call-signaling entities.

17. A method according to claim 16, wherein each of said multiple messages is either
a) an individual message containing message content for one of the further parties only or
b) a further combined message containing message content for a plurality of further parties.

18. A method according to claim 1, wherein said network element collects response messages sent from a plurality of call-signaling entities in response to a request message from said first party, combines content of said response messages to eliminate repeated content and to generate a still further combined message, and transmits said still further combined message to said first party.

19. A method according to claim 1, wherein said network element determines in response to a message of said first party whether there are remembered sessions for said first party, and if there are remembered sessions, sends messages to each call-signaling entity of the parties of said remembered sessions.

20. A method according to claim 1, further comprising inserting information into a message indicating whether to remember a particular session.

21. A method according to claim 20, wherein said inserting inserts said information as an additional message header or as an optional parameter to an existing message header.

22. A method according to claim 1, wherein said sessions and/or subsessions comprise session initiation protocol (SIP) sessions and/or subsessions.

23. A memory storing computer-executable instructions which, when executed by a processor, cause the processor to perform a method comprising:
registering a first party to a network,
receiving an invitation message from said first party inviting a second party to a session,
determining from a session information relating to said session whether said session is to be retained by said network,
retaining the session by the network in response to the determining,
said retaining comprising storing of at least part of said session information for a subsequent re-establishment or release of said session by said network on behalf of said first party,
releasing said retained session by said network towards said second party on behalf of said first party, when said first party deregisters from said network or loses connection with said network,
re-establishing said retained session by said network towards said second party on behalf of said first party, when said first party repeatedly registers to said network or re-establishes connection with said network,
wherein said method is used for managing multiple simultaneous sessions between parties participating in one or a plurality of group calls, and wherein each of said parties is destined for being in respective sessions with all of the other parties or at least some of the other parties, at least the sessions between said first party and further parties being respectively divided in
a first subsession between said first party and a network element, and
a second subsession between said network element and a call-signaling entity serving a group call with at least one of said further parties,
thereby combining first subsessions in a combined session between said first party and said network element,
wherein said network element stores information in a register, said information indicating remembered sessions for parties.

24. The memory of claim 23, storing further computer-executable instructions which, when executed by the processor, cause the processor to perform a method comprising triggering said re-establishing of all retained sessions on behalf of said first party by said network during the registering of the first party.

25. The memory of claim 23, storing further computer-executable instructions which, when executed by the processor, cause the processor to perform a method comprising collecting responses relating to said re-establishing of all retained sessions into a single response to said first party.

26. The memory of claim 23, storing further computer-executable instructions which, when executed by the processor, cause the processor to perform a method comprising processing an indicator carried in a response message to an invitation message for inviting a party to a session during the determining from said session information relating to said session whether said session is to be retained.

27. The memory or claim 23, storing further computer-executable instructions which, when executed by the processor, cause the processor to perform a method comprising analyzing the session information that comprises an identity of said second party during the determining from said session information relating to said session whether said session is to be retained.

28. The memory of claim 23, storing further computer-executable instructions which, when executed by the processor, cause the processor to perform a method comprising deleting said stored at least part of said session information when said first party leaves said session.

29. The memory of claim 23, storing further computer-executable instructions which, when executed by the processor, cause the processor to perform a method comprising combining said second subsessions between said network element and said call-signaling entity in a second combined session.

30. The memory of claim 29, storing further computer-executable instructions which, when executed by the processor, cause the processor to perform a method comprising combining of media streams from second subsessions between said network element and at least one of said further parties into a single media stream relating to the first subsession between said first party and said network element.

31. The memory of claim 23, storing farther computer-executable instructions which, when executed by the processor, cause the processor to perform a method comprising:

collecting response messages sent from a plurality of call-signaling entities in response to a request message from said first party; and combining content of said response messages to eliminate repeated content and to generate a still further combined message; and transmitting said still further combined message to said first party.

32. The memory of claim 23, storing further computer-executable instructions which, when executed by the processor, cause the processor to perform a method comprising:

determining in response to a message of the first party whether there are remembered sessions for the first party; and sending messages to each call-signaling entity of the parties of said remembered sessions, if there are remembered sessions.

33. The memory of claim 23, storing further computer-executable instructions which, when executed by the processor, cause the processor to perform a method comprising inserting information into a message indicating whether to remember a particular session.

* * * * *